United States Patent
Lhuillier et al.

(10) Patent No.: US 9,581,241 B2
(45) Date of Patent: Feb. 28, 2017

(54) PLASTIC PRIMARY PISTON WITH INSERT FOR A TANDEM PENETRATION-TYPE MASTER CYLINDER AND A MASTER CYLINDER EQUIPPED WITH SUCH A PISTON

(75) Inventors: Laurent Lhuillier, Le Blanc Mesnil (FR); Daniel Grech, Lamorlaye (FR); Olivier Bernadat, Le Perreux (FR); Marc Rodriguez, Beverley Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 637 days.

(21) Appl. No.: 13/996,670

(22) PCT Filed: Nov. 30, 2011

(86) PCT No.: PCT/EP2011/071364
§ 371 (c)(1),
(2), (4) Date: Feb. 10, 2014

(87) PCT Pub. No.: WO2012/084435
PCT Pub. Date: Jun. 28, 2012

(65) Prior Publication Data
US 2014/0150645 A1 Jun. 5, 2014

(30) Foreign Application Priority Data
Dec. 21, 2010 (FR) .................... 10/05009

(51) Int. Cl.
*F16J 9/00* (2006.01)
*F16J 1/01* (2006.01)
*B60T 11/232* (2006.01)
*B60T 11/236* (2006.01)

(52) U.S. Cl.
CPC ............... *F16J 1/01* (2013.01); *B60T 11/232* (2013.01); *B60T 11/236* (2013.01)

(58) Field of Classification Search
CPC .................................. F16J 1/01; B60T 11/16
See application file for complete search history.

(56) References Cited

U.S. PATENT DOCUMENTS

| | | | |
|---|---|---|---|
| 4,831,916 A * | 5/1989 | Leigh-Monstevens . | B60T 11/16 403/135 |
| 6,470,791 B1 * | 10/2002 | Welter ................ | B60T 11/165 92/188 |
| 2003/0075397 A1 | 4/2003 | Gravier | |
| 2005/0044852 A1 | 3/2005 | Tsubouchi et al. | |

(Continued)

FOREIGN PATENT DOCUMENTS

| CN | 1781787 | 6/2006 |
|---|---|---|
| CN | 1902071 | 1/2007 |

(Continued)

*Primary Examiner* — Thomas E Lazo
*Assistant Examiner* — Daniel Collins
(74) *Attorney, Agent, or Firm* — Gerard Messina

(57) ABSTRACT

A primary piston of molded plastic material equipped with a metallic insert and having grooves, mounted in a master cylinder comprising at least a primary piston and a secondary piston mounted in the bore hole of the master cylinder. These pistons can create pressure, respectively, in a primary pressure chamber and in a secondary pressure chamber due to the action of a push rod on the primary piston.

11 Claims, 3 Drawing Sheets

(56) References Cited

U.S. PATENT DOCUMENTS

2009/0090105 A1* 4/2009 Taira .................. B60T 11/16
60/585

FOREIGN PATENT DOCUMENTS

| | | |
|---|---|---|
| CN | 101260914 | 9/2008 |
| DE | 19534220 | 3/1997 |
| DE | 10 2006 00034 | 1/2007 |
| EP | 185165 | 6/1986 |
| EP | 2 199 164 | 6/2010 |
| FR | 2 820 701 | 8/2002 |
| FR | 2 827 244 | 1/2003 |
| JP | 52-39072 | 3/1977 |
| JP | 2004-28339 | 1/2004 |
| JP | 2006-280229 | 10/2006 |

* cited by examiner

PLASTIC PRIMARY PISTON WITH INSERT FOR A TANDEM PENETRATION-TYPE MASTER CYLINDER AND A MASTER CYLINDER EQUIPPED WITH SUCH A PISTON

FIELD OF THE INVENTION

The present invention relates to a master-cylinder primary piston for an automobile and to vehicle master cylinders equipped with such a piston.

BACKGROUND INFORMATION

Master cylinders known to the state of the art have a primary piston and a secondary piston generally made of aluminum, both of which are installed in series in an axial bore hole of a brake master-cylinder body, generally made of aluminum and machined. Such a master cylinder is discussed in document FR 2,827,244 and document DE 102, 006,000,341 A1. A push rod placed in a cavity of the primary piston is used to actuate the displacement of the primary piston. The primary piston serves to pressurize a primary pressure chamber and the secondary piston serves to pressurize a secondary pressure chamber. Primary and secondary springs tend to push the pistons in the direction opposite displacement, thereby ensuring the increase in pressure.

The bore hole of the master cylinder is supplied with brake fluid from two supply access holes that are connected to a brake fluid reservoir. The supply access holes are used to supply the primary and secondary pressure chambers. These holes emerge in annular chambers; annular seals known as "cups" are provided on either side of the annular chambers.

The supply of brake fluid to the pressure chambers occurs when the pistons are at rest. The pistons are then in the position shown in FIG. 1. Supply occurs by passages provided in the piston walls and which then enable the supply access holes and the annular chambers to communicate with the interior of the primary and secondary pistons, emerging respectively in the primary and secondary pressure chambers. When the pistons are moved axially forward (direction of arrow D in FIG. 1), the piston passages cross the seals, isolating the supply chambers and enabling the establishment of brake pressure in the primary and secondary pressure chambers.

The master cylinder assembly is capable of being installed on a brake-assist servomotor.

When the pistons are displaced along the direction of arrow D by the push rod that exercises a selective force on the primary piston, cup 4 isolates the primary pressure chamber from the primary supply access hole and cup 6 isolates the secondary pressure chamber from the supply access hole. When the force on the push rod is released, the volume of brake fluid accumulated in the brakes and springs of the master cylinder pushes the pistons into rest position. At times, when the push rod is rapidly released, the brake fluid contained in the pressure chambers of the master cylinder can drop below atmospheric pressure due to the action of the springs, which push the pistons more rapidly than the capacity of brake fluid to pass through the master cylinder. When the pistons reach rest position, communication between the reservoir at atmospheric pressure and the chambers of the master cylinder is directly established and a sudden surge of brake fluid occurs, which generates noise in the master cylinder, known as a "fluid hammer."

To improve the performance of master cylinders, it is necessary to provide aluminum master-cylinder pistons with specific shapes, which shapes can result in significant additional costs due to the complexity of their manufacture.

SUMMARY OF THE INVENTION

An object of the exemplary embodiments and/or exemplary methods of the present invention is to provide a plastic primary piston for a master cylinder that is easy to produce, economical, and capable of resisting mechanical stress.

An object of the exemplary embodiments and/or exemplary methods of the present invention is a master-cylinder primary piston installed in a brake master cylinder of the type described above, comprising at least the primary piston and a secondary piston installed in a bore hole of the master cylinder. These pistons allow a pressure to be created in a primary pressure chamber and a secondary pressure chamber, respectively, by the action of a push rod on the primary piston, characterized in that the primary piston is of molded plastic material and equipped with an overmolded stamped sheet-metal insert situated between a primary pressure chamber of the master cylinder and a receiving cavity of the push rod, where the push rod exercises a force to displace the primary piston and generate pressure in the master cylinder, and also has at least one groove on its exterior diameter emerging in a forward face of the primary piston, and that it may be made of a thermoset plastic, or may be made of a phenolic resin filled with glass fibers.

The overmolding of a piston body on the insert provides a seal between them. The plastic body and the metallic insert provide the primary piston with increased mechanical resistance and help to reduce the thicknesses of plastic materials and make the primary piston more compact.

Another beneficial characteristic is that the body of the primary piston is easily made by injection molding, which allows complex shapes to be produced, such as grooves, ribs, non-cylindrical holes.

According to another beneficial characteristic, the body of the piston is easily made by injection molding and the primary piston leaving the mold is ready for assembly without requiring any finishing work, unlike the aluminum piston, which requires additional machining.

According to another beneficial characteristic, the body of the piston is easily made by molding thermoset plastic materials, which allow the surface to be ground by machining to improve the reliability of the master cylinder.

According to another beneficial characteristic, the body of the piston is easily made by injection molding plastic materials, which allow noises caused by the brake fluid to be damped.

According to another beneficial characteristic, the metallic insert has at least one hole to maintain the insert in the mold before injection of the plastic material.

According to another beneficial characteristic, the insert is made of a magnetizable material so that the piston emits a magnetic field capable of being detected by a magnetic-field sensor.

The thickness of the insert is configured to resist a master-cylinder test pressure of 40 MPa, this thickness taking into account the diameter of the primary piston and the bearing section of the push rod.

The different objects and characteristics of the exemplary embodiments and/or exemplary methods of the present invention will appear more clearly in the description and in the attached figures.

DETAILED DESCRIPTION

Figure 1:
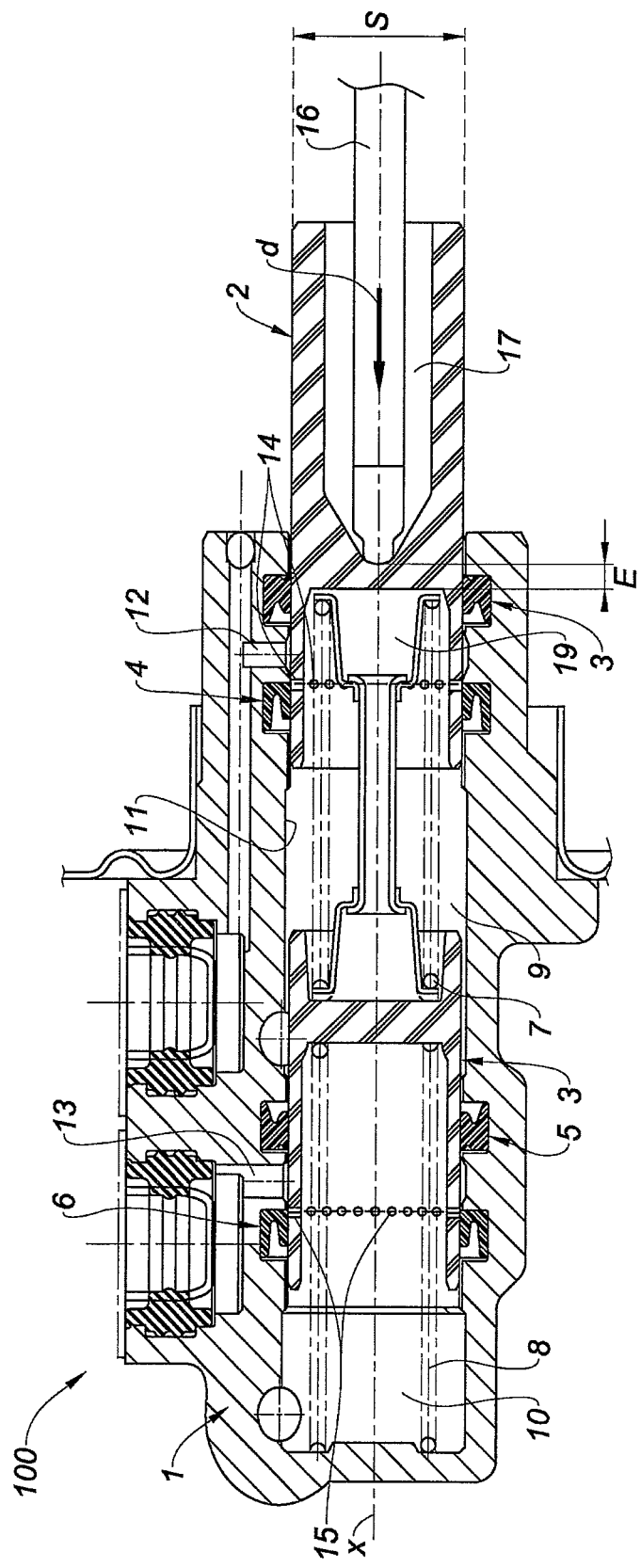
FIG. 1 shows an axial cutaway of a master cylinder known to the state of the art and previously described.

In FIG. 1, therefore, we find brake master cylinder 100 having bore hole 11 in which primary piston 2 and secondary piston 3 and primary spring 7 and secondary spring 8 have been placed. Pistons 2 and 3 serve to pressurize, respectively, primary pressure chamber 9 and secondary pressure chamber 10. Brake fluid supply access holes 12 and 13 are intended to be connected to a brake fluid reservoir (not shown). On either side of access hole 12, cups 3 and 4 are provided and, on either side of access hole 13, cups 5 and 6 are provided. When the master cylinder is at rest, the primary piston is in the position shown in FIG. 1. The piston walls are equipped with passages 14 and 15 and enable holes 12 and 13 to communicate with the interior of the piston and primary pressure chambers 9 and secondary pressure chamber 8. At rest, cups 4 and 6 enable communication between access holes 12 and 13 and primary and secondary pressure chambers 9 and 8, which are thereby supplied with brake fluid.

When braking force is applied in direction D by a push rod 16 placed in cavity 17 of primary piston 2, primary piston 2 is moved in the direction of arrow D, cup 6 blocks hole-shaped passages 15, and cup 4 blocks passages 14. Because the primary and secondary pressure chambers are isolated from holes 12 and 13, a pressure is established in chambers 9 and 10, this pressure being proportional to the force exercised along direction D by push rod 16, which is placed in cavity 17 of primary piston 2. The external diameter S of primary piston 2 forms a section on which the pressure of the primary chamber acts. In cavity 17 of the primary piston, push rod 16 applies a force to generate a pressure in the master cylinder but on a diameter that is appreciably smaller, at a minimum 4 times smaller. This creates significant stress on the primary piston and requires a minimum thickness of material E between the receiving cavity of push rod 17 and forward cavity 19 of primary piston 2 emerging in pressure chamber 9.

Figure 2:
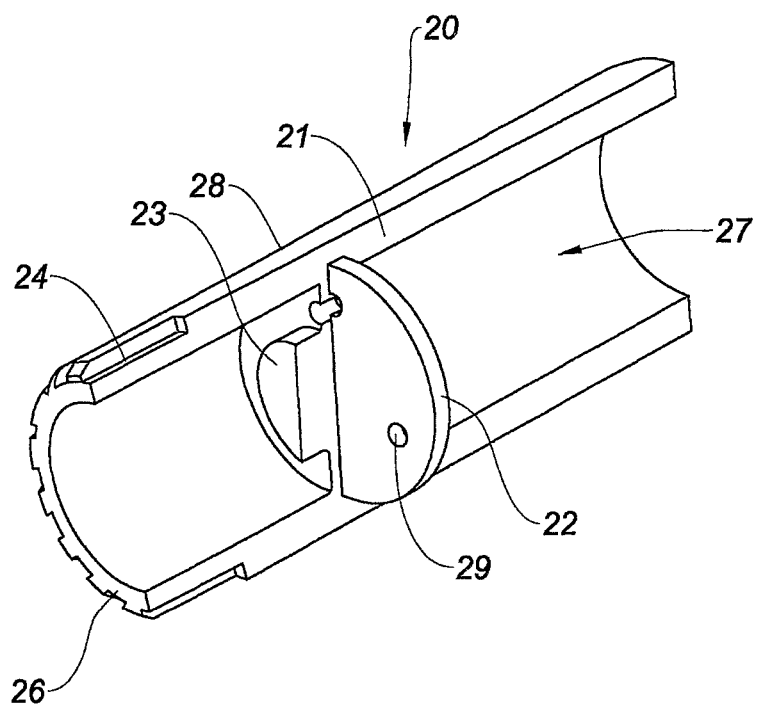
FIG. 2 shows an isometric view with a partial cutaway of an embodiment of a master-cylinder piston according to the invention, with grooves situated in the front of the piston.
Figure 3:
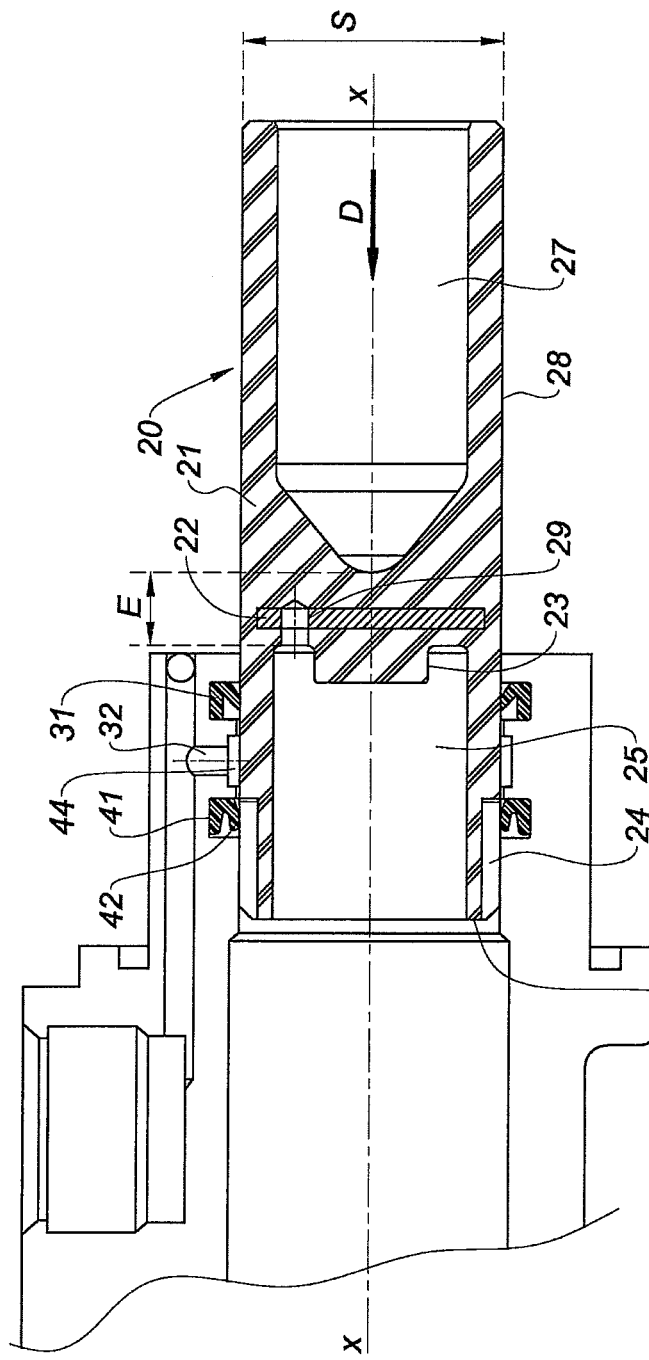
FIG. 3 shows a partial axial view of an embodiment of a portion of a master cylinder according to the invention, secondary piston, and springs, which are not shown.

In FIGS. 2 and 3 can be seen a master-cylinder primary piston 20 according to the exemplary embodiments and/or exemplary methods of the present invention, characterized in that primary piston 20 has body 21 of molded plastic material equipped with an overmolded stamped sheet-metal insert situated between a forward cavity 25 and a receiving cavity of push rod 27 and in that it also has at least one groove 24 on a surface 28 emerging on forward face 26. Grooves 24 are of sufficient length so that, when the master cylinder is at rest, the grooves allow brake fluid to pass beneath a seal point 42 of cup 41 and emerge in annular chamber 44 situated between cups 31 and 41. These grooves form passages between the pressure chamber and the annular chamber connected to the reservoir by hole 32. It would have been possible to realize grooves 24 of aluminum but this would have resulted in significant additional costs. The use of plastic materials helps to reduce costs because the shapes of the grooves can be incorporated into the mold. The use of those same plastic materials requires that thicknesses be increased and additional material be used to overcome the difference in the mechanical resistance of the materials. Plastic body 21 and metallic insert 22 confer increased mechanical resistance upon the primary piston and allow the thickness E of the plastic materials to be reduced, making piston 20 more compact and, therefore, the invention, through the placement of the insert between forward cavity 25 and the receiving cavity of push rod 27, provides the benefits of the mechanical resistance of aluminum and the ease of manufacture of complex shapes such as grooves through the use of plastic materials that can be molded. Moreover, the compactness of the primary piston allows the master cylinder itself to be more compact and results in savings on master-cylinder materials.

Another advantageous characteristic is that body 21 of piston 20 is easily made by injection molding, which allows for the realization of complex shapes such as grooves 24.

According to another beneficial characteristic, body 21 of the piston is easily made by molding thermoset plastic materials, which allow surface 28 to be ground by machining in order to improve the reliability of the master cylinder.

According to another beneficial characteristic, metallic insert 22 has at least one hole 29 to maintain the insert in the mold before injection of the plastic material, the axis of the hole being advantageously appreciably parallel to the X-axis of the primary piston. After injection of plastic material, hole 29 of insert 22 forms a blind hole in piston 20.

According to another advantageous characteristic, the master cylinder has primary piston 20 and insert 22, made of magnetizable material, so that the piston emits a magnetic field capable of being detected by a magnetic-field sensor.

REFERENCE KEY 1 body
2 primary piston
3 secondary piston
4 cup
5 cup
6 cup
7 spring
8 spring
9 secondary pressure chamber
10 primary pressure chamber
11 bore hole
12 hole
13 hole
14 grooves
15 holes
16 push rod
17 primary piston cavity
18 cup
19 forward cavity
20 primary piston according to the invention
21 piston body
22 insert
23 spring centerer
24 groove
25 forward cavity
26 front face of piston
27 push-rod receiving cavity
28 piston surface
29 hole
31 cup
32 hole
41 cup 42 seal point
44 annular chamber
100 tandem master cylinder
E thickness of material between the two cavities
S piston diameter
X axis of the master cylinder and pistons

The invention claimed is:

1. A primary piston for a tandem penetration-type brake master cylinder, comprising:
   a primary piston of molded plastic material and having an overmolded stamped sheet-metal insert situated between a forward cavity and a cavity, and also having at least one groove on the surface emerging on a forward face;
   wherein the metallic insert has at least one hole, and
   wherein the hole is substantially parallel to the axis of the piston.

2. The primary piston of claim 1, wherein the primary piston is made of a thermoset plastic material.

3. The primary piston of claim 1, wherein, after injection of the plastic material, the hole of the insert forms a blind hole in the piston.

4. The primary piston of claim 1, wherein the surface of the piston is ground by machine.

5. The primary piston of claim 1, wherein the primary piston is made of plastic materials capable of damping noise.

6. A master cylinder, comprising:
   a master cylinder arrangement: and
   at least a primary piston and a secondary piston mounted in a bore hole of the master cylinder arrangement, wherein the primary piston is of molded plastic material and having a metallic insert situated between the forward cavity and the primary pressure chamber and in that it also has at least one groove on a surface emerging on the forward face,
   wherein the metallic insert has at least one hole, and
   wherein the hole is substantially parallel to the axis of the piston.

7. The master cylinder of claim 6, wherein the insert of the primary piston is made of a magnetizable material, so that the piston emits a magnetic field capable of being detected by a magnetic field sensor.

8. The master cylinder of claim 6, wherein the primary piston is made of a thermoset plastic material.

9. The master cylinder of claim 6, wherein, after injection of the plastic material, the hole of the insert forms a blind hole in the piston.

10. The master cylinder of claim 6, wherein the surface of the piston is ground by machine.

11. The master cylinder of claim 6, wherein the primary piston is made of plastic materials capable of damping noise.

* * * * *